United States Patent
Li

(10) Patent No.: US 8,120,906 B2
(45) Date of Patent: Feb. 21, 2012

(54) MOUNTING APPARATUS FOR ELECTRONIC DEVICE

(75) Inventor: Zhan-Yang Li, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 141 days.

(21) Appl. No.: 12/700,574

(22) Filed: Feb. 4, 2010

(65) Prior Publication Data
US 2011/0096499 A1 Apr. 28, 2011

(30) Foreign Application Priority Data
Oct. 27, 2009 (CN) .................. 2009 2 0313411 U

(51) Int. Cl.
*H05K 7/20* (2006.01)
(52) U.S. Cl. ............. 361/679.58; 361/679.57; 361/695; 415/119; 415/213.1
(58) Field of Classification Search .................. None
See application file for complete search history.

(56) References Cited

U.S. PATENT DOCUMENTS

| | | | |
|---|---|---|---|
| 5,186,605 A * | 2/1993 | Tracy | 601/2 |
| 6,351,380 B1 * | 2/2002 | Curlee et al. | 361/695 |
| 7,189,053 B2 * | 3/2007 | Winkler et al. | 415/108 |
| 7,312,991 B2 * | 12/2007 | Lee et al. | 361/695 |
| 7,545,641 B2 * | 6/2009 | Chen | 361/695 |
| 7,885,065 B2 * | 2/2011 | Kaneko et al. | 361/695 |
| 2007/0237625 A1 * | 10/2007 | Liang | 415/119 |
| 2008/0137295 A1 * | 6/2008 | Chen | 361/695 |
| 2008/0175705 A1 * | 7/2008 | Liu | 415/119 |
| 2008/0232062 A1 * | 9/2008 | Lee | 361/687 |

* cited by examiner

*Primary Examiner* — Courtney Smith
(74) *Attorney, Agent, or Firm* — Altis Law Group, Inc.

(57) ABSTRACT

An electronic device includes an electronic component, a first fixing member, a second fixing member, and a locking member. The first fixing member and the second fixing member are respectively mounted on two sides of the electronic component. The locking member connects the first fixing member to the second fixing member. A pivot portion is formed on one side of the locking member to engage with the first fixing member. A latching portion is formed on the other side of the locking member to latch the second fixing member.

20 Claims, 4 Drawing Sheets

MOUNTING APPARATUS FOR ELECTRONIC DEVICE

BACKGROUND

1. Technical Field

The present disclosure relates to electronic devices, and particularly, to a fan mounting apparatus ("apparatus") in an electronic device.

2. Description of Related Art

Computer systems such as servers typically facilitate 24-hour cycle information systems demands Cooling fans (or, heat dissipation devices) for such computers are usually screwed to the server chassis but component failure can potentially adversely impact productivity and/or business. The fans are typically screwed to racks adjacent to the heat-generating component(s) of computers and other devices. However, their assembly is time-consuming.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
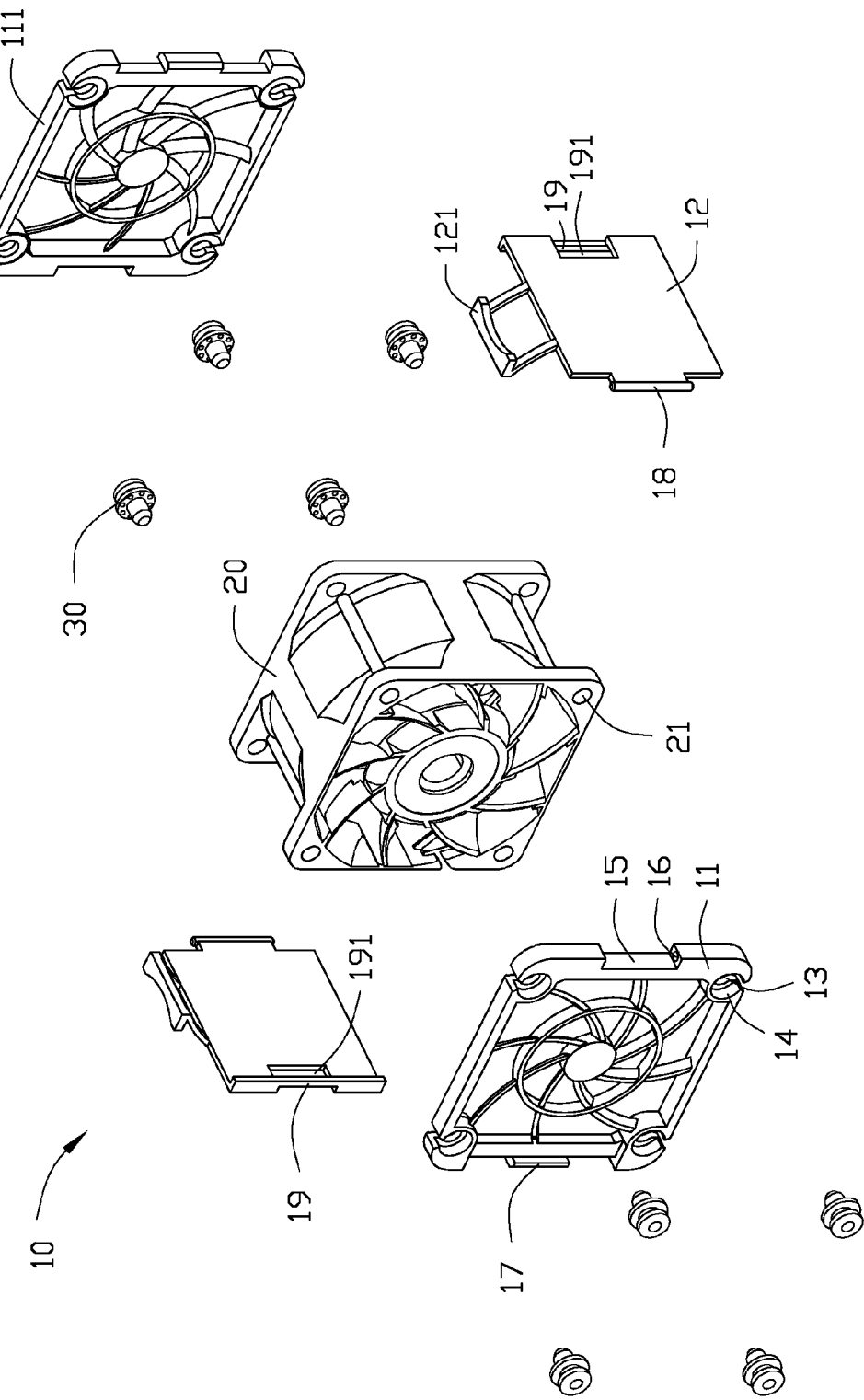
FIG. 1 is an isometric, exploded view of an embodiment of a fan mounting apparatus.

Referring to FIG. 1, an electronic apparatus may be a fan mounting apparatus in an embodiment, the apparatus 10 accommodates a fan 20. The apparatus 10 includes a first fixing member 11, a second fixing member 111, and two locking members 12. The second fixing member 111 can have an identical configuration with the first fixing member 11. The second fixing member 111 is oppositely positioned relative to the first fixing member 11. A plurality of stepped holes is defined in the first and second fixing members 11, 111. Each stepped hole includes a connecting hole 13 with small diameter and a receiving hole 14 with large diameter. A cutout 15 is defined in one side of the first and second fixing members 11, 111. Two pivot holes 16 are defined in the first and second fixing members 11, 111 adjacent to the cutout 15. A hook 17 is formed on the other side of the first and second fixing members 11, 111.

A pivot portion is formed on the locking member 12. Two shafts 18 are formed on the pivot portion. A latching portion is formed on the locking member 12. The latching portion includes a flange 19 and an opening 191 adjacent to the flange 19. A handle 121 extends from the locking member 12 to disengage the first and second fixing members 11, 111 from the locking member 12.

Figure 2:
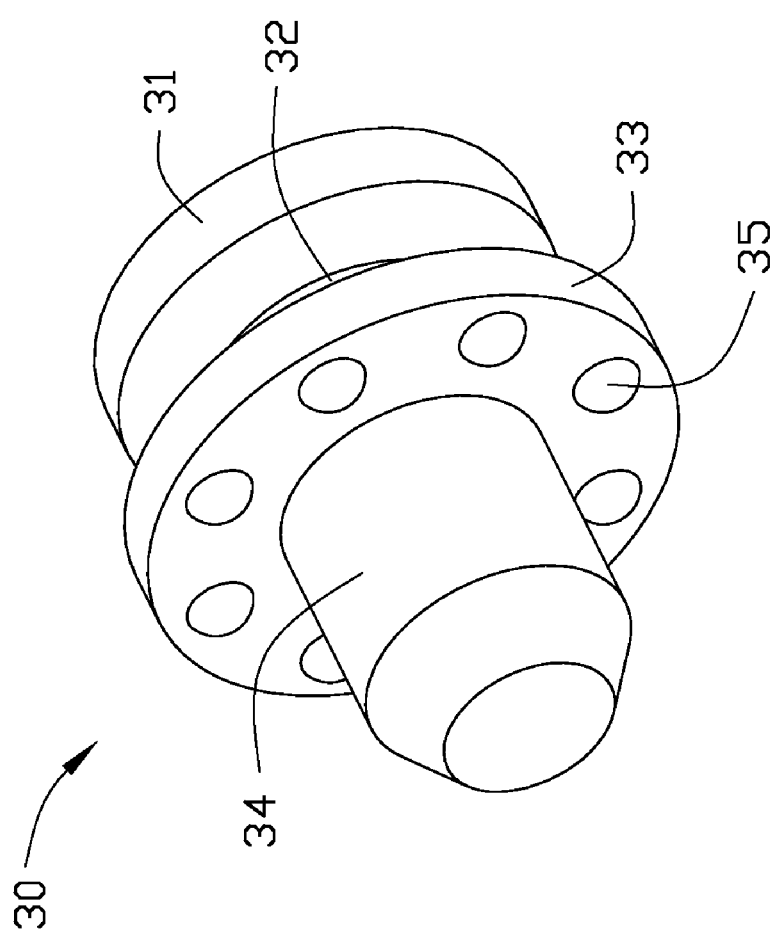
FIG. 2 is an isometric view of a vibration-absorbing member.

Referring to FIG. 2, a vibration-absorbing member 30 includes a head portion 31, a neck portion 32, a bottom portion 33, and a fixing portion 34. A hole 21 is defined in the fan 20 corresponding to the fixing portion 34. A plurality of resilient protrusions 35 projects from the bottom portion 33 to act as a buffer.

Figure 3:
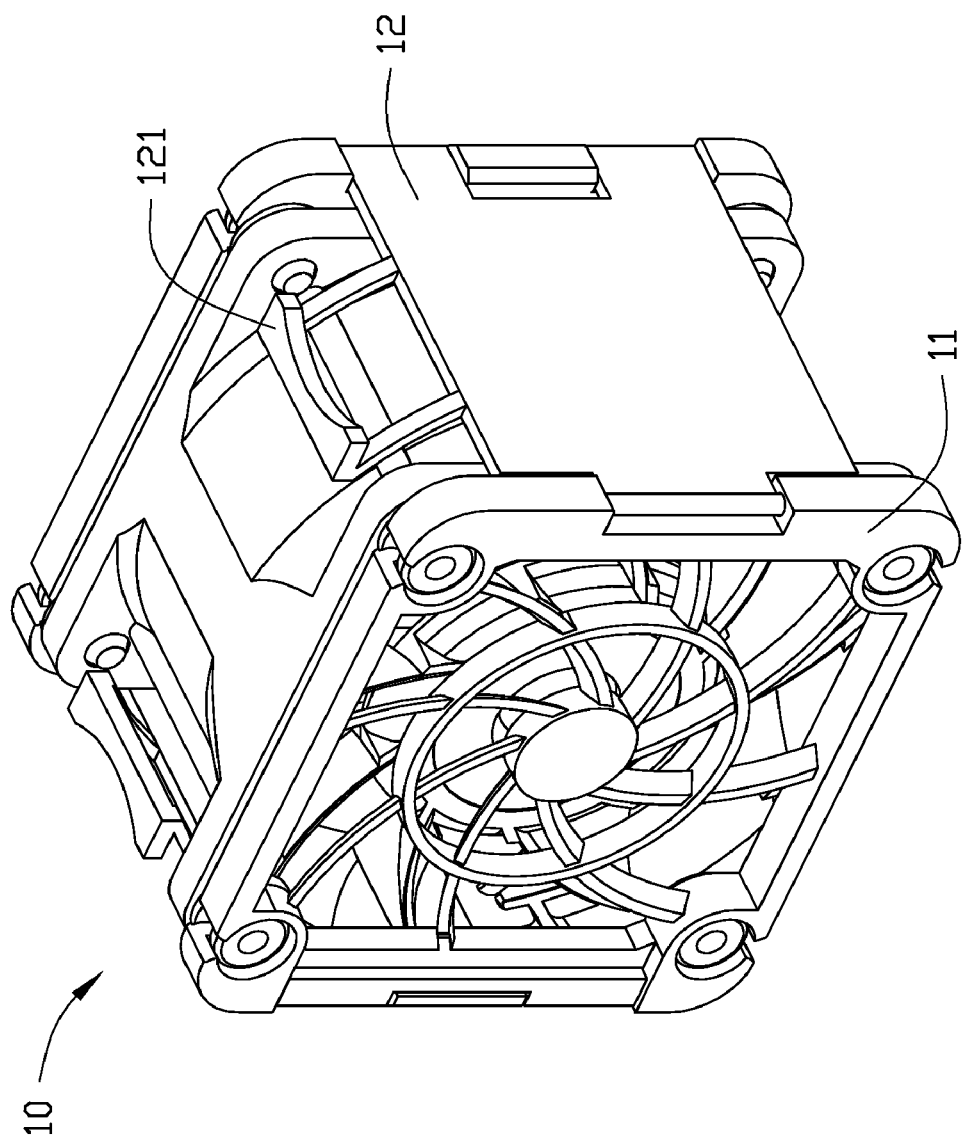
FIG. 3 is an assembled view of the fan mounting apparatus of FIG. 1.
Figure 4:
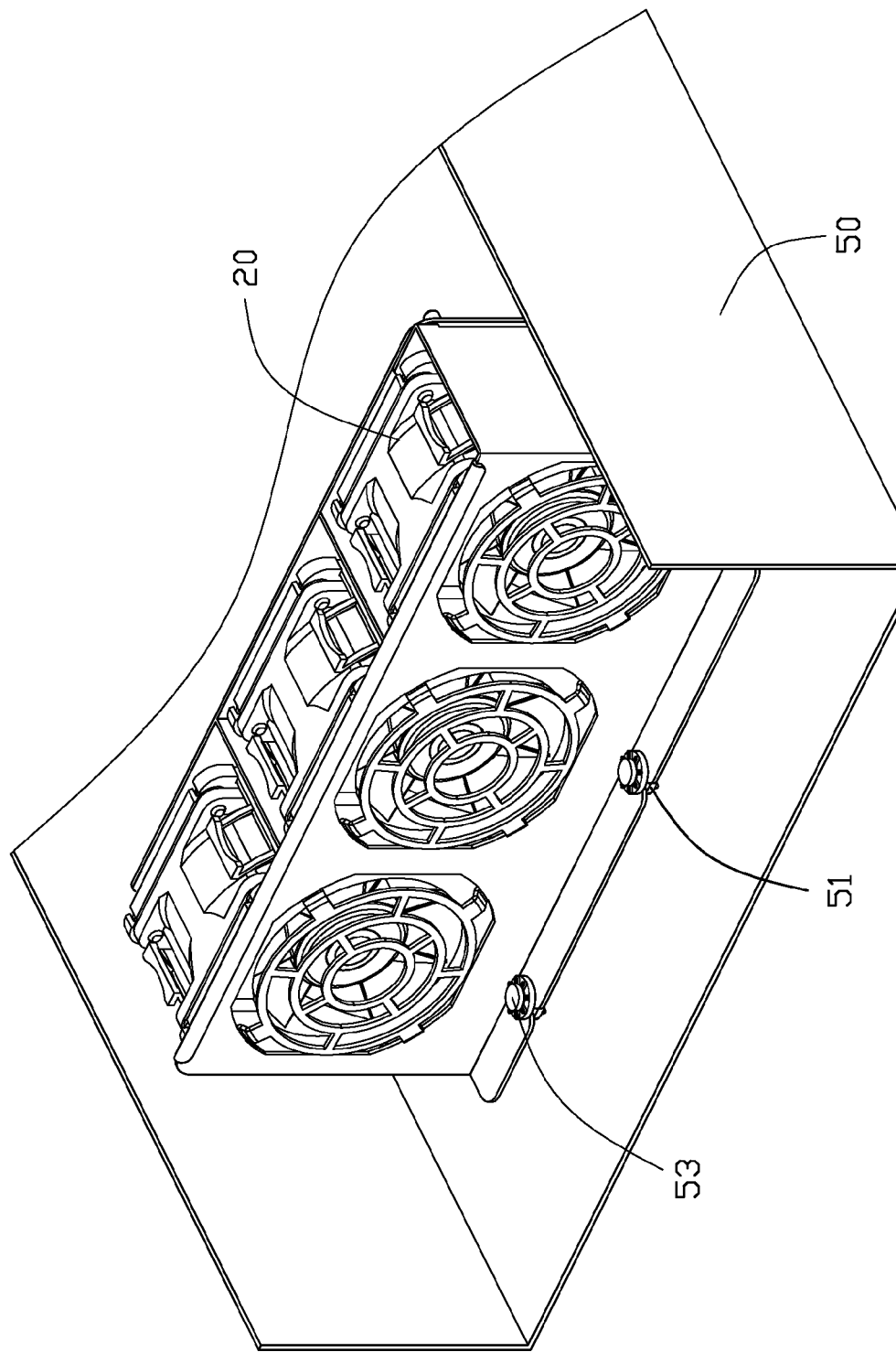
FIG. 4 is an assembled view of the fan mounting apparatus mounted in an electronic device.

Referring to FIGS. 3 and 4, the vibration-absorbing member 30 is mounted on the first and second fixing members 11, 111. The head portion 31 is inserted in the receiving hole 14. The neck portion 32 is inserted in the connecting hole 13. The first and second fixing members 11, 111 are secured on the fan 20. The fixing portion 34 is inserted in the hole 21. The bottom portion 33 is sandwiched between the first and second fixing members 11, 111 and the fan 20.

The shafts 18 are received in the cutout 15 and inserted in the pivot holes 16. The hook 17 is inserted in the opening 191 and engages with the flange 19. The fan 20 is mounted on the first and second fixing members 11, 111.

The apparatus 10 is fixed on an electronic device 50. A plurality of projections 51 projects from the electronic device 50. A hole is defined in each projection 51 to receive a screw 53.

In disassembly, the handle 121 is pulled to disengage the hook 17 from the opening 191. The vibration-absorbing member 30 is extricated from the fan 20. The shaft 18 is removed from the pivot holes 16. The locking member 12 unlocks from the first and second fixing members 11, 111.

While the present disclosure has been illustrated by the description of preferred embodiments thereof, and while the preferred embodiments have been described in considerable detail, it is not intended to restrict or in any way limit the scope of the appended claims to such details. Additional advantages and modifications within the spirit and scope of the present disclosure will readily appear to those skilled in the art. Therefore, the present disclosure is not limited to the specific details and illustrative examples shown and described.

What is claimed is:

1. An electronic device, comprising:
   an electronic component;
   a first fixing member;
   a second fixing member, the first fixing member and the second fixing member respectively mounted to two sides of the electronic component;
   a locking member connecting the first fixing member to the second fixing member, a pivot portion formed on one side of the locking member to engage with the first fixing member, a latching portion formed on the other side of the locking member to latch the second fixing member;
   wherein a hook is located on the second fixing member and is engaged with the latching portion, the latching portion comprises an opening and a flange, the opening receives the hook, and the flange engages the hook.

2. The electronic device of claim 1, wherein a cutout is defined in the first fixing member that accommodates the pivot portion.

3. The electronic device of claim 2, wherein two pivot holes are defined in the first fixing member adjacent to the cutout, two shafts are inserted in the pivot holes.

4. The electronic device of claim 1, further comprising a vibration-absorbing member secured between the electronic component and the first fixing member.

5. The electronic device of claim 4, wherein the vibration-absorbing member comprises a head portion and a neck portion, a stepped hole is defined in the first fixing member, the stepped hole comprises a receiving hole with large diameter that accommodates the head portion and a connecting hole with small diameter that receives the neck portion.

6. The electronic device of claim 4, wherein the vibration-absorbing member further comprises a bottom portion sandwiched between the electronic component and the first fixing member, and a plurality of resilient protrusions projects from the bottom portion.

7. The electronic device of claim 4, wherein the vibration-absorbing member further comprises a fixing portion fixing the electronic component and the first fixing member.

8. The electronic device of claim 1, wherein a handle is located on the locking member and is capable of disengaging the second fixing member from the locking member.

9. A fixing assembly, comprising:
a first fixing member;
a second fixing member;
two locking members connecting the first fixing member and the second fixing member, a pivot portion formed on one side of each locking member to pivotably connect with the first fixing member, and a latching portion located on the other side of each locking member to lock the second fixing member;
wherein a hook is located on the second fixing member and is engaged with the latching portion, the latching portion comprises an opening and a flange, the opening receives the hook, and the flange engages the hook.

10. The fixing assembly of claim 9, wherein a cutout is defined in the first fixing member that accommodates the pivot portion.

11. The fixing assembly of claim 10, wherein two pivot holes are defined in the first fixing member adjacent to the cutout, and two shafts are inserted in the pivot holes.

12. The fixing assembly of claim 9, further comprising a vibration-absorbing member secured between the electronic component and the first fixing member.

13. The fixing assembly of claim 12, wherein the vibration-absorbing member comprises a head portion and a neck portion, a stepped hole is defined in the first fixing member, and the stepped hole comprises a receiving hole with large diameter, that accommodates the head portion, and a connecting hole, with small diameter that receives the neck portion.

14. The fixing assembly of claim 12, wherein the vibration-absorbing member further comprises a bottom portion sandwiched between the electronic component and the first fixing member, and a plurality of resilient protrusions projects from the bottom portion.

15. The fixing assembly of claim 12, wherein the vibration-absorbing member further comprises a fixing portion fixing the electronic component and the first fixing member.

16. The fixing assembly of claim 9, wherein a handle is located on the locking member and is capable of disengaging the second fixing member from the locking member.

17. A fixing assembly, comprising:
a first fixing member, a cutout defined in a first side of the first fixing member, a hook located on a second side of the first fixing member;
a second fixing member having the same configuration as the first fixing member; and
two locking members, each locking member having a pivot portion located in each cutout to pivotably connect to the first fixing member and the second fixing member, and a latching portion engaging with each hook of the first fixing member and the second fixing member.

18. The fixing assembly of claim 17, wherein each latching portion comprises an opening and a flange, and each hook extends through each opening to engage each flange.

19. The fixing assembly of claim 17, wherein a pair of pivot holes is defined in each of the first fixing member and the second fixing member adjacent to each cutout, and a shaft is inserted in each pair of pivot holes.

20. The fixing assembly of claim 17, wherein the first fixing member is parallel to the second fixing member.

* * * * *